Aug. 8, 1967        E. J. POLTORAK        3,334,774

FLUID SEAL

Filed Nov. 27, 1964

INVENTOR.
EMIL J. POLTORAK
BY
John A. McKinney
ATTORNEY

United States Patent Office 3,334,774
Patented Aug. 8, 1967

3,334,774
FLUID SEAL
Emil Jacob Poltorak, Somerville, N.J., assignor to Johns-Manville Corporation, New York, N.Y., a corporation of New York
Filed Nov. 27, 1964, Ser. No. 414,389
10 Claims. (Cl. 220—46)

ABSTRACT OF THE DISCLOSURE

A fluid seal adapted for use in an autoclave and having and L-shaped cross section, the vertical leg of the L being bifurcated, with protuberance means to facilitate actuation of the legs of the L into increased sealing engagement. The seal is preferably extruded from a composition to form a strip having good resiliency and good heat (steam) resistance characteristics.

---

This invention relates to a resilient seal or gasket and more particularly to a seal to effectively seal vessels such, for example, as autoclaves wherein the walls are subject to differential pressure and temperatures at the interior and exterior sides.

It is customary in autoclave design to provide a channel in the terminal portion of the wall, immediately adjacent the point where the closing element makes contact with the wall and to provide an extruded or molded rubber gasket of some cross-sectional shape in the channel to form sealing means between the vessel and the closing element. In order for the autoclave to operate effectively, it is of utmost importance that the pressure be maintained constant within the autoclave. Any failure in the seal will not only disrupt the effectiveness of the heating or curing process being carried out within the autoclave, but also might prove to be injurious to any workmen that are close by because of the escaping high temperature and pressurized steam. A further problem which arises in autoclave gaskets is the high pressure and temperature conditions which can adversely affect seals of ordinary rubber composition and configuration and tend to make them brittle.

Accordingly, it is an object of this invention to provide a seal which is not adversely affected by high temperatures and pressures.

Another object of this invention is to provide a seal that has a substantially longer life than the usual seal.

Another object of this invention is to provide a seal having a configuration adapted to constantly urge the seal in sealing engagement.

Other objects and advantages of this invention will become apparent during the course of the following description when taken in connection with the accompanying drawings.

To accomplish the objects of this invention, a preferred embodiment comprises an extruded elastomer-type gasket. The gasket is extruded in a generally L-shaped configuration, with the vertical leg of the L being bifurcated and the terminal portions of the bifurcation having enlarged or bulbous portions or protuberances to reinforce terminal portions and provide extended areas or engagement with the channel portion of a wall receiving the gasket. The lateral leg of the L preferably progressively diminishes in thickness as it extends away from the juncture of the lateral leg with the vertical leg. Also, on what may be termed for purposes of description the top side of the lateral leg, there is provided a protuberance which may be an annular bead to deter extended surface contact of the top side with the portion of the vessel wall immediately adjacent to and defining the channel in which the gasket is normally positioned. On the bottom side of the L and also on the underside of the area forming the junction between the legs of the L, a series of annular beads or protuberances are provided to deter surface contact of the underside surface with the closing element of the autoclave or other enclosure. The spaces intermediate these protuberances also serve the function of a plenum where localized pressures, which may break through one of the retention areas, defined by the protuberance, can be dissipated or equally distributed around the periphery of the seal. The distribution of the pressure deters disruption of the other sealing retention areas.

Figure 1:
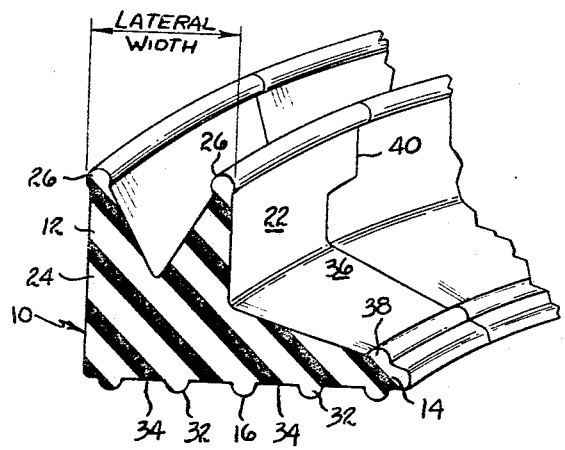
FIG. 1 is a cross-sectional view of a strip forming the gasket of this invention.

Referring to the drawings, and more particularly to FIG. 1, the construction of gasket 10 disclosed comprises a strip having a bifurcated leg 12, which for purposes of description may be termed a vertical leg, for the retention of the sealing strip 10 in a channel 20 or other appropriate holding means for the seal, and an integral lateral leg 14 defining the main sealing or closing face 16.

Figure 2:
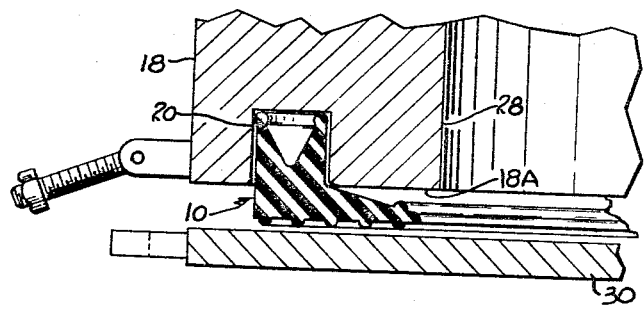
FIG. 2 is a fragmentary cross-sectional view through the wall of an autoclave illustrating the position of the gasket prior to compression by the closing member of the autoclave.
Figure 4:
FIG. 4 is a cross-sectional view of a typical gasket now employed in conjunction with autoclaves.

In order to enhance retention of the strip 10 within the channel 20 the bifurcations 22 and 24 of the vertical leg 12 are provided with bulbous portions 26, shown to be in the form of annular beads and with the protruding portions being laterally spaced apart to define a lateral width greater than the width of the channel 20 in which the gasket 10 is to be mounted. The dimensional relationship of the protruding portion with the channel provides an arrangement wherein the bifurcations are resiliently deflected and make positive sealing engagement with the wall 18 defining the channel as may be observed in FIG. 2.

Usually, the surfaces to be sealed in an autoclave are rough and uneven. Consequently, unless appropriate means are provided to compensate for the irregularities in the surfaces to be sealed, the sealing engagement is easily disrupted. The instant invention deters disruption of the sealing engagement between the terminal wall portion 18A of the enclosure 28 and the closing element 30 by providing a series of retention areas in the form of continuous bead portions 32. The bead portions 32 define spaces 34 intermediate thereof which serve the function of plenum chambers where localized pressures which may escape through one or more of the inner bead portions or retention areas, can be dissipated or equally distributed around the periphery of the seal 10 and hence disruption of the other retention areas is deterred. Also, in the event of a high spot on one or the other of the surfaces to be sealed, the entire underside of the gasket will not be deflected. Rather, only the corresponding bead portion will be disrupted. The remaining bead portions will maintain and thus retain sealing engagement of the gasket between the surfaces to be sealed.

The top side 36 of the lateral leg 14 of the gasket is provided with one or more protuberances 38, shown to be in the form of an annular bead. Also, the lateral leg 14 preferably progressively diminishes in thickness so that when the gasket 10 is installed, the steam, within the autoclave or enclosure 28, may enter the area between the top side 36 of the lateral leg 14 of the gasket 10 and the wall portion 18A defining the channel 20, on the inner side thereof, and actuate the lateral leg 14 into increased sealing engagement with the closure member 30.

It will be readily understood that many methods may be employed for the fabrication of the gasket of this invention. However, a preferred method involves extruding a composition compounded with ethylene-propylene terpolymer sold under the trademark Nordel by the DuPont Company in accordance with compounding procedures known in the art to produce the following physical characteristics:

| | |
|---|---|
| Tensile strength, p.s.i. | 2570 |
| Elongation, percent | 540 |
| Hardness, Shore A | 73 |
| Specific gravity | 1.33 |
| Mooney scorch at 250° F. _____minutes__ | [1] 12 |

[1] 5 point rise from minimum.

The compound is extruded through a die having a head temperature of 230° F. and a barrel temperature of 160° F. The extruded stock is put into an autoclave and cured 60 minutes at 60 pounds steam (307° F.). A strip 10 is then cut from the continuous length of the extruded stock to correspond to the peripheral length of the channel wherein the gasket is to be inserted. Preferably, the ends are cut to form a step joint 40 (FIG. 1) and then are cemented together.

Figure 3:
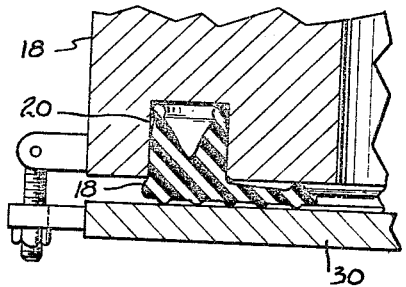
FIG. 3 is a view similar to FIG. 2 but illustrating the gasket after compression by the closing member of the autoclave.

The instant invention provides a gasket design whereby intimacy of contact is facilitated between the channel wall 18 and the vertical leg member 12 of the L-shaped gasket 10, particularly at the terminal portions thereof where protuberances 26 are provided. As may be viewed in FIG. 3 when the closing element of the autoclave is moved to the closed position, the gasket 10 is compressed and the protuberances 26 of the bifurcations 22 and 24 are deformed into increased surface contact and engagement with the wall 18 of the channel 20. Also, as can be seen in FIG. 3, the intimacy of contact between the underside or face 16 of the gasket and the surface of the closing element 30 is enhanced by the pressure exerted by the steam within the autoclave 28 actuating and flexing the lateral leg 14 of the gasket 10. The thickness of the lateral leg 14 is so related to permit flexure where required, at the juncture of the lateral leg 14 with the vertical leg 12 but yet maintains rigidity where required. The serrated bottom face 16 of the gasket 10 also provides means for compensating for irregularities on the faces to be sealed of the enclosure.

Having provided a complete description of the invention in a manner to distinguish it from the prior art, and having provided a description of the best modes presently contemplated of carrying out the invention, the scope of patent protection to be granted is defined by the following claims.

What I claim:

1. A fluid seal adapted for insertion in a channel, comprising: a base portion, a lateral leg extending from said portion and forming therewith a generally L-shaped cross-sectional configuration, the thickness of said lateral leg being progressively diminished in a direction extending away from the juncture of said lateral leg with said base portion, a protuberance on the upper side of said lateral leg defining means whereby establishment of continuous surface contact of said top side with an element to be sealed is deterred.

2. The seal as described in claim 1 which further comprises a series of beaded portions on the underside of said lateral leg defining a corresponding series of engaging portions for sealing engagement with a member to be sealed.

3. A fluid seal adapted for insertion in a channel, comprising a base member having a bifurcated portion, with each leg of the bifurcation having an enlarged bulbous portion at the terminal end thereof, and with each leg progressively increasing in thickness in a direction extending from the bulbous portions toward the junctures of said legs with the base, and a lateral leg extending from said base member and forming therewith a generally L-shaped cross-sectional configuration.

4. The fluid seal as described in claim 2, wherein the lateral width of said base member at the bulbous portion is greater than the width of the channel in which said seal is to be inserted.

5. A fluid seal adapted for insertion in a channel comprising: a base portion, a lateral leg extending from said portion and forming therewith a generally L-shaped cross-sectional configuration, the thickness of said lateral leg being progressively diminished in a direction extending away from the juncture of said lateral leg with said base portion, a protuberance on the upper side of said lateral leg defining means to deter establishing continuous surface contact of said top side with an element to be sealed, a base member having a bifurcated portion, with each leg of the bifurcation having an enlarged bulbous portion at the terminal end thereof, and with each leg progressively increasing in thickness in a direction extending from the bulbous portions toward the junctures of said legs with the base, and a lateral leg extending from said base member and forming therewith a generally L-shaped cross-sectional configuration.

6. A fluid seal suitable for use with high temperature, high pressure fluids, comprising: a bifurcated base portion, with each leg of the bifurcation having a protruding portion at the terminal end thereof, a lateral leg extending from said base portion to define a generally L-shaped cross-sectional configuration, a protuberance on the upper side of said lateral leg defining means to deter establishing continuous surface contact of said top side with an element in which a seal is to be installed, a series of beaded portions on the underside of said lateral leg to define a corresponding series of engaging portions for sealing engagement with a member to be sealed.

7. A fluid actuable sealing strip for disposition in a channel of a fluid pressurized vessel between said vessel and a closing element, said strip comprising: a bifurcated base portion, with each bifurcation having a protruding portion, the protruding portions being laterally spaced apart a distance greater than the width of said channel and adapted to be resiliently deflected when inserted in said channel, a lateral leg extending from said base portion to define a gasket strip having a cross-sectional configuration generally in the form of an L, the thickness of said lateral leg being progressively diminished in a direction extending away from the juncture of said lateral leg with said base portion, a protuberance on the top side of said lateral leg to deter establishing continuous surface contact of said top side with the wall portion of said vessel immediately adjacent to and defining said channel, and a series of protuberances on the underside of said sealing strip and defining a plurality of spaced apart sealing engagement surfaces for engaging the closing element of said vessel.

8. In combination, a fluid pressurized enclosure having a wall and a closing member to be sealed, said wall defining a channel in an end face thereof, said channel being adapted to receive a sealing member; and a sealing member in said channel, said sealing member comprising: a bifurcated base portion, with each bifurcation having a protruding portion, the protruding portions, before insertion of said sealing member in said channel, being laterally spaced apart a distance greater than the width of said channel and adapted to be resiliently deflected when inserted in said channel, a lateral leg extending from said base portion to define a gasket strip having a cross-sectional configuration generally in the form of an L, the thickness of said lateral leg being progressively diminished in a direction extending away from the juncture of said lateral leg with said base portion and toward the center of said enclosure, a protuberance on the top side of said lateral leg to deter establishing continuous surface contact of said top side and whereby said top side is exposed to the fluid pressure within said enclosure, and a series of protuberances on the underside of said sealing strip and defining a plurality of spaced apart sealing engagement surfaces for engaging the closing element of said vessel.

9. A fluid seal adapted for insertion in a channel, comprising: a strip extruded from a composition compounded with ethylene-propylene terpolymer and having the following physical characteristics:

| | |
|---|---|
| Tensile strength, p.s.i. | 2570 |
| Elongation, percent | 540 |
| Hardness, Shore A | 73 |
| Specific gravity | 1.33 |
| Mooney scorch at 250° F. minutes | [1] 12 |

[1] 5 point rise from minimum.

said strip having a base portion, a lateral leg extending from said portion and forming therewith a generally L-shaped cross-sectional configuration, the thickness of said lateral leg being progressively diminished in a direction extending away from the juncture of said lateral leg with said base portion, a protuberance on the upper side of said lateral leg defining means whereby establishment of continuous surface contact of said top side with an element to be sealed is deterred.

10. The method of producing the fluid seal strip described in claim 9, which method comprises extruding the compound through a die having a head temperature in the general range of 230° F. and a barrel temperature in the general range of 160° F. and curing the extruded strip in an autoclave at 60 pounds steam.

References Cited

UNITED STATES PATENTS

| | | | |
|---|---|---|---|
| 2,352,192 | 6/1944 | Gasche | 220—46 |
| 2,396,491 | 3/1946 | Chamberlain | 277—209 |
| 3,088,627 | 5/1963 | Saunders | 220—46 |

THERON E. CONDON, *Primary Examiner.*

G. T. HALL, *Assistant Examiner.*